G. URBAN, Jr.
CAMPING VEHICLE.
APPLICATION FILED JULY 30, 1920.
1,412,379.
Patented Apr. 11, 1922.
4 SHEETS—SHEET 3.
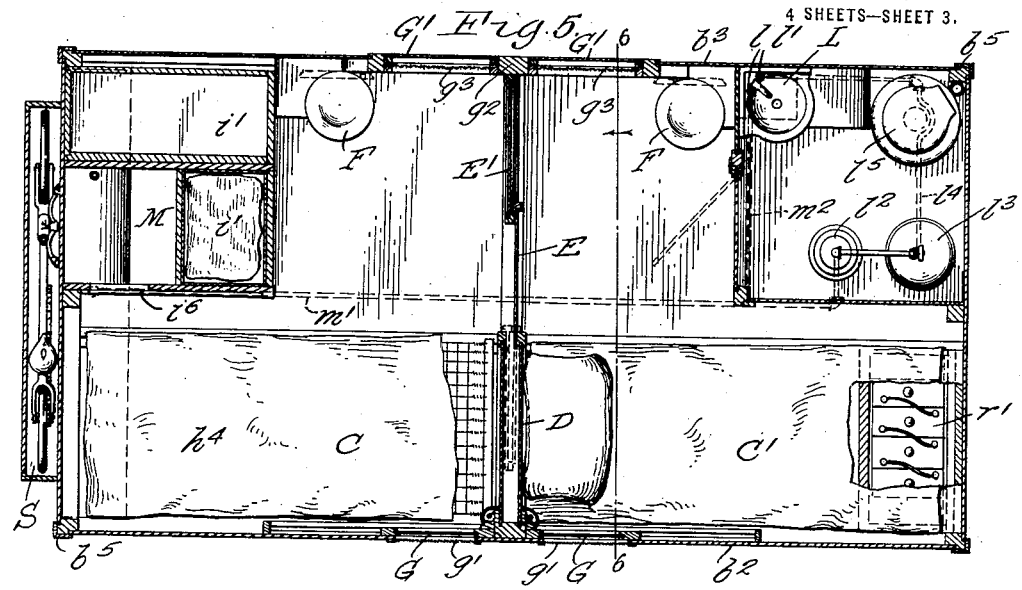
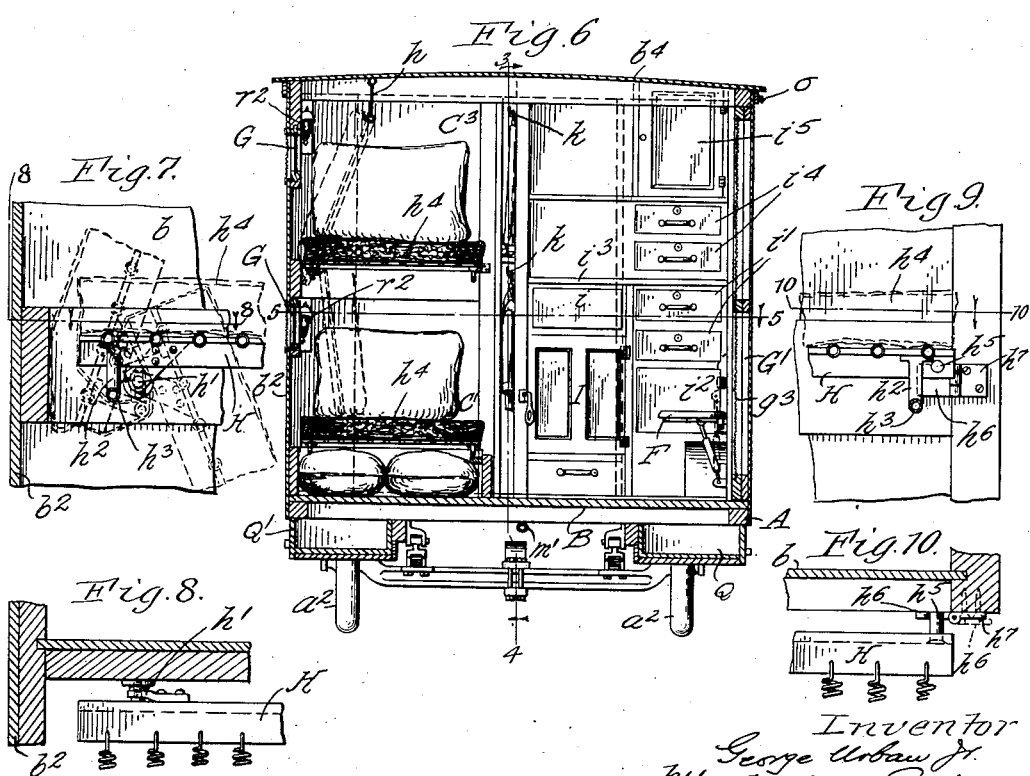
Inventor
George Urban Jr.
by Parker & Prochnow.
Attorneys

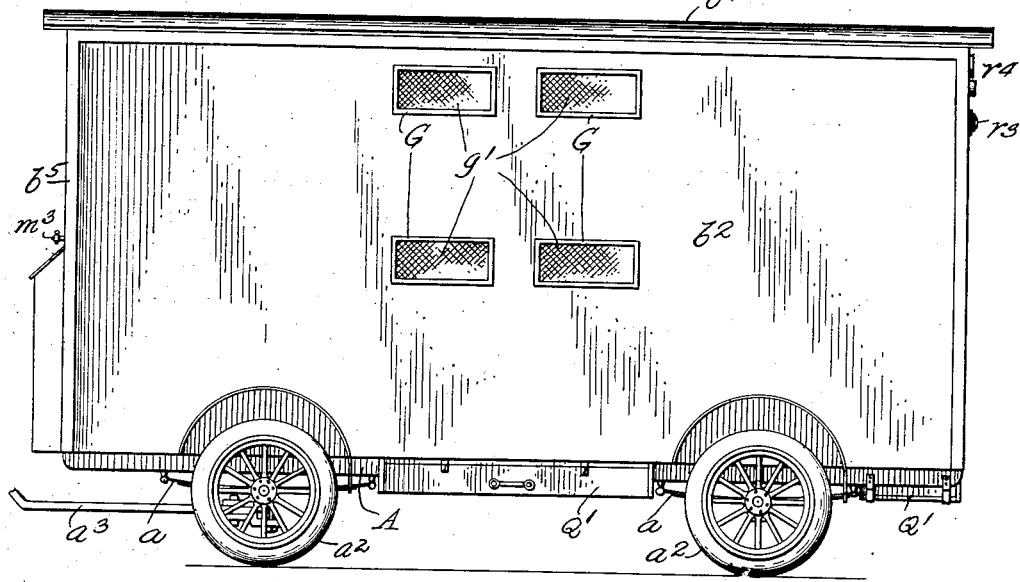
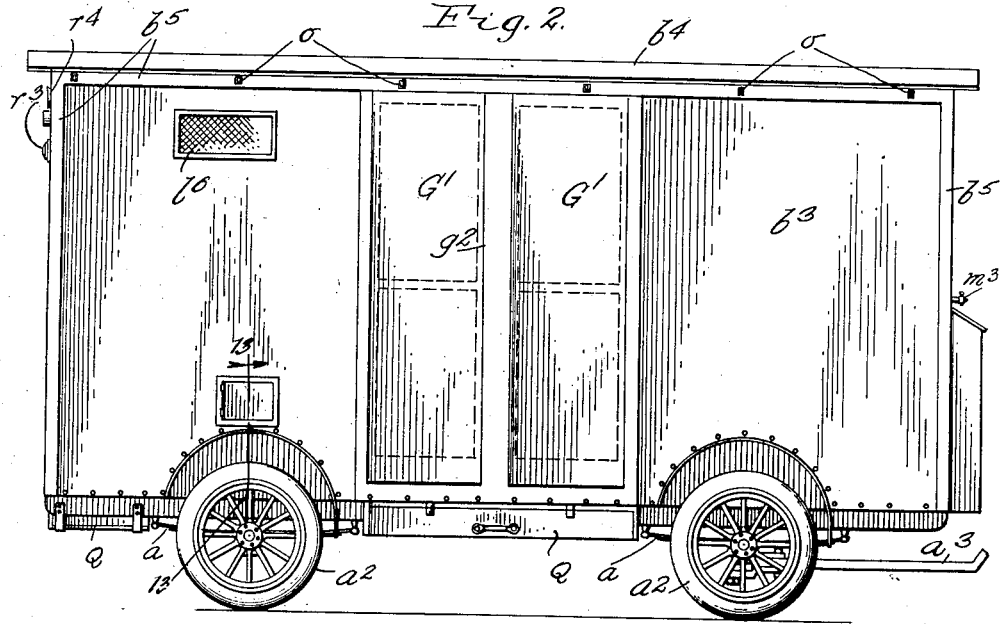

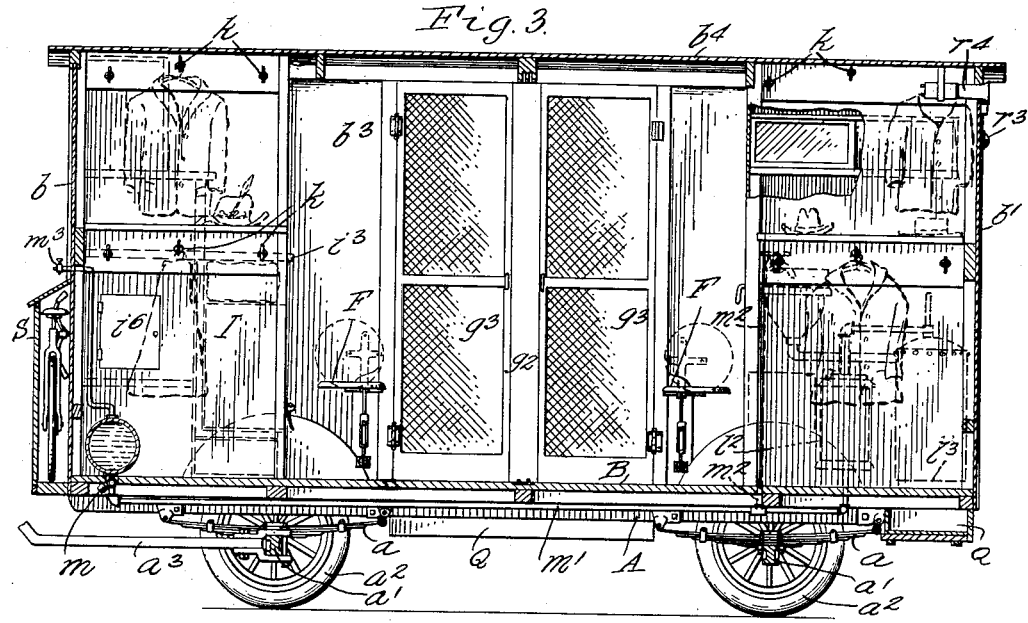
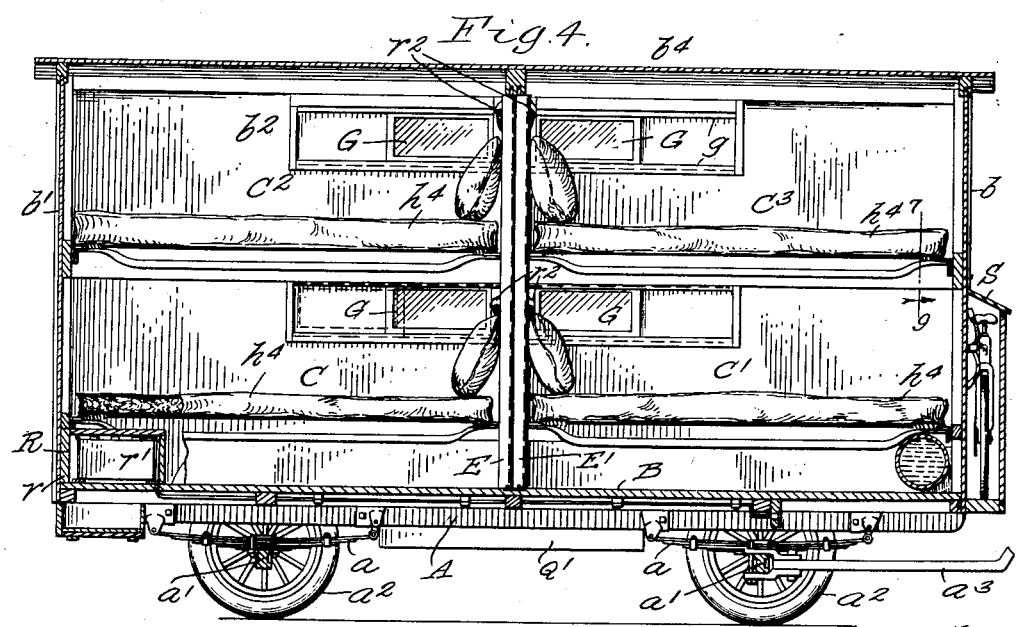

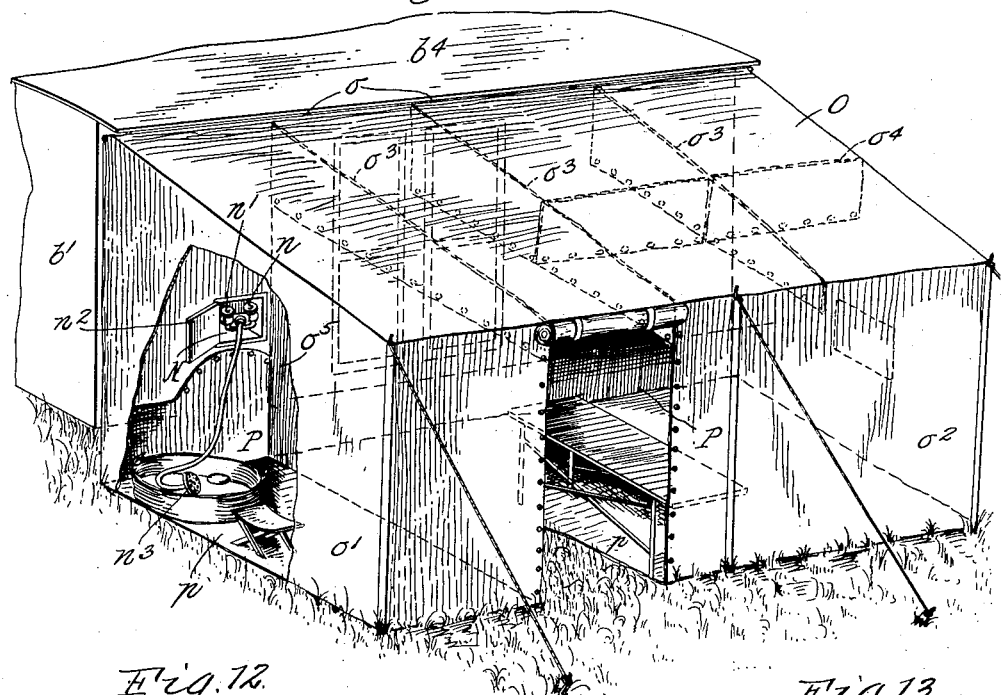
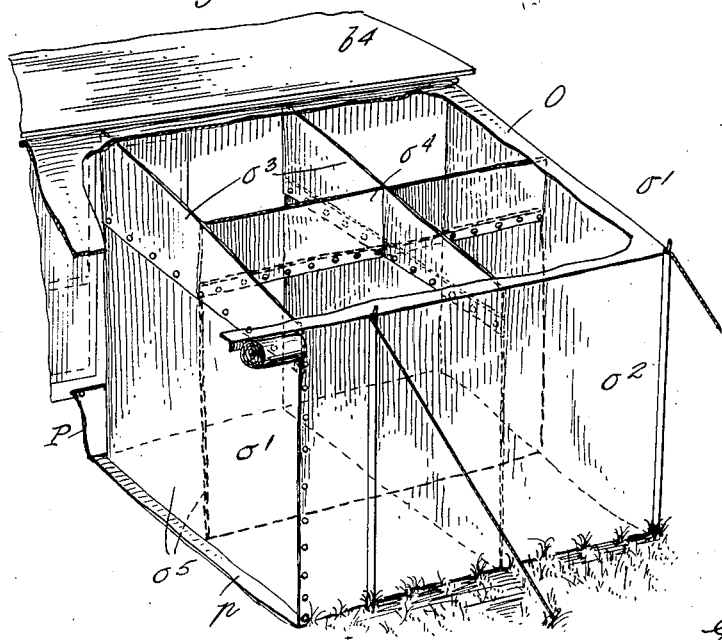
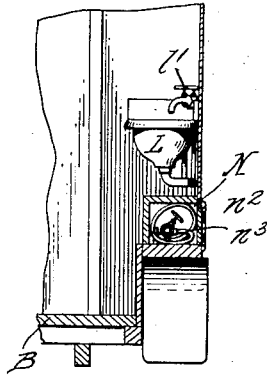

UNITED STATES PATENT OFFICE.

GEORGE URBAN, JR., OF BUFFALO, NEW YORK.

CAMPING VEHICLE.

1,412,379.  Specification of Letters Patent.  Patented Apr. 11, 1922.

Application filed July 30, 1920. Serial No. 400,156.

*To all whom it may concern:*

Be it known that I, GEORGE URBAN, Jr., a citizen of the United States, residing at Pine Ridge, Buffalo, in the county of Erie and State of New York, have invented a new and useful Improvement in Camping Vehicles, of which the following is a specification.

This invention relates to vehicles or trailers of the kind which may be used for camping, and more particularly to vehicles of this kind which are always ready for use and which require no pitching of tents or adjustments to render them ready for use.

The objects of this invention are to provide a vehicle of this kind in which the interior and furnishings are so arranged as to afford the maximum of comfort within the limited space available; also to provide a vehicle of this kind with fittings and furnishings which form a part of the vehicle and which make it possible to readily convert the interior of the vehicle into one or more sleeping compartments or into a living room; also to provide a tent of improved construction which may be used in connection with the vehicle if desired; also to improve the construction of camping vehicles of this kind in other respects hereinafter specified.

In the accompanying drawings:—

Fig. 1 is a side elevation of a camping vehicle embodying the invention.

Fig. 2 is an elevation of the opposite or entrance side thereof.

Figs. 3 and 4 are longitudinal sectional elevations thereof on line 3—4, Fig. 6, Fig. 3 being in the direction of the arrow 3, Fig. 6, and Fig. 4 being a section looking in the opposite direction as indicated by the arrow 4, Fig. 6.

Fig. 5 is a sectional top plan view thereof on line 5—5, Fig. 6.

Fig. 6 is a transverse sectional elevation thereof on line 6—6, Fig. 5.

Fig. 7 is a transverse fragmentary sectional elevation on line 7—9, Fig. 4, indicating different positions of the upper berth.

Fig. 8 is a horizontal sectional view on line 8—8, Fig. 7.

Fig. 9 is a transverse fragmentary sectional elevation on line 7—9, Fig. 4, showing the upper berth in horizontal position.

Fig. 10 is a fragmentary horizontal view thereof on line 10—10, Fig. 9.

Fig. 11 is a fragmentary perspective view thereof showing a tent arranged at the side of the vehicle.

Fig. 12 is a fragmentary perspective view thereof showing more in detail a part of the tent.

Fig. 13 is a fragmentary sectional elevation thereof on line 13—13, Fig. 2.

The vehicle embodying the invention may be mounted on a chassis of any suitable or desired construction, that shown including a frame A having springs $a$ secured thereto which are connected with axles $a'$ on which the wheels $a^2$ are arranged. The front wheels are adapted to be turned in horizontal planes for the purpose of steering the vehicle and the steering mechanism (not shown) is suitably operated from a draft bar tongue $a^3$ by means of which the vehicle is pulled. The vehicle is primarily intended as a trailer in connection with an automobile, but may be otherwise propelled if desired. All of these parts may be of any suitable or desired construction and of themselves constitute no part of this invention.

The body of the vehicle includes a floor B which is suitably mounted on the frame of the chassis and which may be of any suitable or desired construction, front and rear end walls $b$ and $b'$, a side wall $b^2$, an opposite side wall $b^3$, which is provided with a suitable entrance, and a roof $b^4$. The walls and roof, in the construction shown, are made of composition board, and the roof and floor and each wall with the exception of the side wall $b^3$ are preferably made of a single piece so as to insure an absolutely water and dust tight construction. The walls of the vehicle are fastened to a suitable framework which is preferably as light as possible so that the vehicle will not be top heavy. The edges at which the side walls meet are preferably trimmed with wooden strips $b^5$ or the like which serve to hold the composite board sides in place and also to conceal the edges thereof.

The vehicle is preferably of such length that two sets of berths can be arranged end on end lengthwise within the vehicle, each set consisting of two berths one arranged above the other. C C' represent the lower berths and $C^2$ $C^3$ represent the upper berths. These berths may be of any usual or suitable construction, and the adjacent ends of the two sets of berths are secured to a central dividing wall or partition D of the vehicle, which in the construction shown is made of two panels spaced apart to form a hollow wall. The space between the two parts of the partition D is occupied by the parts of a sliding door, which in the construction shown consists of two sections E and E'. The two parts of the sliding door when not in use are slid into or arranged within the hollow wall D as shown in dotted lines in Fig. 5, and the parts of the sliding door may be drawn out so as to divide the space within the vehicle into two separate compartments or rooms each of which has an upper and a lower berth. When the doors are open and concealed within the hollow wall D, the interior of the vehicle is opened into a single room or compartment, and a table may be placed across the space otherwise occupied by the sliding doors. In this case the lower berths may be used as seats, and chairs or stools F, which are preferably permanently secured to the wall $b^3$ of the vehicle, may also be used. When the chairs F are not in use they may be swung into substantially vertical positions as shown in dotted lines in Figs. 3, 5, and 6, in which positions they occupy very little space. By means of the arrangement of the interior of the vehicle as described the same can be readily converted from a single room into two rooms, so that the occupants may enjoy the privacy of single rooms and may have a larger room when desired. This construction also has the advantage of forming a double wall between the berths which prevents to a large extent any sounds from passing from one set of berths to the other.

In order to afford ventilation within the vehicle, windows are preferably provided in the side wall $b^2$, a window being arranged in convenient position for each berth. These windows G are arranged in slides or guide ways formed on the inner face of the side wall $b^2$ so as to permit the window to be opened or closed to any desired extent. By means of the arrangement shown the occupant of each berth can regulate the amount of air desired for himself without being in any way affected by the other windows. Each window is also preferably protected by means of a screen $g'$ suitably secured at the outer face of the side wall $b^2$. On the opposite side of the vehicle two doors G' are secured in suitable door frames. These doors are separated by a pillar or post $g^2$ so that when the vehicle is divided into two compartments, a separate entrance is afforded to each compartment or room. Screen doors $g^3$ are preferably provided which are arranged on the same door frames as the main doors G'. By means of this construction the vehicle can be ventilated as may be desired, and while the same is on the road the windows and doors can be kept closed so as to exclude all dust.

The lower berths C C' may be supported in their operative positions in any desired manner and the upper berths $C^2$ $C^3$ are preferably hinged or pivoted at their outer longitudinal edges in such a manner as to swing downwardly or upwardly into the dotted line positions shown in Fig. 6. When the upper berths are in the lower positions the lower berths may be used as seats, the upper berths then forming backs for the seats. When, on the other hand, the upper berths are not being used for sleeping, they may be swung upwardly and suspended in their upper positions by means of chains, links or the like $h$, Fig. 6. In order to make it possible to swing the upper berths into different positions, the frame H of each berth is pivoted at opposite ends on the frame of the vehicle as shown at $h'$ in Fig. 7. The frame H of each berth is preferably also provided adjacent to each corner with a downwardly projecting arm or part $h^2$, see Fig. 7, the two arms of each side being connected by means of rods $h^3$ to which the adjacent edges of the mattress $h^4$ may be secured, so that the mattress will remain in place on the berth in any position which the berth may occupy. In order to hold the berth in its operative position, the free end of the frame H of each berth is provided with outwardly projecting studs or the like $h^5$ which are adapted to engage a pivoted or hinged plate or leaf $h^6$ which, in the construction shown, is pivotally secured to a plate $h^7$ permanently secured on the frame of the vehicle. When the leaves $h^6$ are swung on their pivots as shown in Fig. 9, the leaves $h^6$ will lie in the path of movement of the stud $h^5$ of the frame of the berth so that the stud will engage the leaf $h^6$, thus holding the upper berth in its substantially horizontal position. When the berth is raised slightly above the horizontal position the leaf $h^6$ may be swung into the position shown in dotted lines in Fig. 10, in which position the stud $h^5$ of the frame of the berth is free to move downwardly.

At one end of the vehicle, the front end in the construction shown, compartments are provided for the storage of eatables, dishes and the like. In the construction shown for this purpose, an ice chest is provided having a food compartment I and an ice compartment $i$. At the side of the ice chest are drawers $i'$ and a cupboard $i^2$, and above the ice chest and drawers $i'$ is a table or shelf $i^3$ on which the cooking or the like can be done. Above the table are shorter drawers and cupboards $i^4$, $i^5$. This construction leaves a storage space in back of the ice chest which is readily accessible from the end of the lower berth C through a door $i^6$, Figs. 3 and 5.

This arrangement is compact and affords ample room for the storage of food and cooking apparatus, and occupies a comparatively small space, but any other arrangement of the drawers, cupboards, etc. may be used.

In the opposite corner of the vehicle, near the rear end thereof, a combined toilet and wash room is provided which occupies substantially the same amount of space as the food and cooking utensil storing space, so that the middle or intermediate portion of the vehicle is unbroken. The walls of the wash room and the food storage space are preferably arranged at a slight distance from the sides of the adjacent berths and this space is provided with hangers $k$ for clothes.

The wash room is provided with a wash basin L having hot and cold faucets $l$ and $l'$ and a water heater $l^2$ is provided in this room. The heater may operate by a burner of any suitable kind and provides a supply of hot water in a hot water storage tank $l^3$ which is connected by means of pipes $l^4$ with the hot water faucet $l'$ of the wash basin. The hot water reservoir also acts as a heater when the vehicle is used in cold weather, since by leaving the door of the wash-room open, the hot water in the water reservoir $l^3$ will keep the interior of the vehicle at a comfortable temperature. $l^5$ represents a toilet bowl which is preferably of the waterless or chemical type and which may be arranged to discharge under the vehicle. The wash room preferably has a window $l^6$ which in the construction shown is substantially similar to the window G.

In order to supply water to the hot water heater and cold water faucet $l$ of the wash basin, a water storage reservoir or tank M is provided which is preferably arranged adjacent to the floor at the front end of the vehicle crosswise thereof. Water is admitted to the tank through a water inlet nipple or connection $m$ and pipes $m'$ and $m^2$ connect the tank with the hot water system and the cold water faucet $l$ of the wash basin. In order to supply the water to the wash basin and the hot water system, water under pressure is admitted to the reservoir through the nipple $m$ in the bottom of the tank, thus compressing the air in the top of the tank. This compressed air will force the water upwardly to the cold water faucet and hot water tank until only a small quantity of water remains in the reservoir. The water will then stop running in the faucets, which gives notice that the water reservoir should be filled, and additional air is then pumped into the tank through the nipple $m$ by a tire pump or other means so that all of the water in the tank can be used. If desired the air may be discharged from the top of the tank through a discharge pipe controlled by a valve $m^3$, and the tank can then be completely filled with water, which will prevent swashing of the water in the tank, as would be the case if an air space were left in the tank. When it is desired to use the water, a small quantity can be drained out of the tank and air can be pumped into the tank.

A shower bath is preferably provided outside of the vehicle. For this purpose a pair of faucets $n$ $n'$ for hot and cold water is provided in a space or compartment N, preferably arranged underneath the wash basin L and having a door $n^2$ which opens from the outside of the vehicle, and the compartment also contains a tube with a shower bath nozzle $n^3$, Figs. 11 and 13.

Means may be provided for securing a tent to the side of the vehicle. For this purpose the side wall $b^3$ thereof is provided just below the roof with a plurality of attaching devices $o$ to which a roof or top O of a tent may be secured. The tent is provided with the usual side walls $o'$ and end wall $o^2$, and is adapted to be divided into a plurality of partitions and for this purpose the top O of the tent is provided with downwardly depending flaps $o^3$ which extend outwardly from the side wall of the vehicle, and a longitudinally extending flap $o^4$. The lower portions of these flaps are provided with suitable fastening devices to which the compartment walls $o^5$ may be secured. By means of the construction shown a bath compartment may be formed at one end of the tent adjacent to the shower bath compartment N of the vehicle, and an entrance compartment may be formed, by means of which access may be had to one of the doors of the vehicle. The other half of the tent may be divided into two or more compartments which extend either lengthwise of the vehicle or transversely thereof, depending upon whether the partition wall is secured to the transverse flap $o^3$ or the longitudinal flap $o^4$. All of the parts of the tent are so made that they can be easily taken apart and stowed within the vehicle when the same is travelling, the spaces under the lower berths forming room for storage of some of the tenting equipment.

In order to further protect the occupants of the tent, a tent wall and ground cloth P is provided which is secured to the lower edges of the side wall $b^3$ of the vehicle, and which extends downwardly to the ground and preferably also lies lengthwise of the ground, forming a ground cloth $p$ for the tent. This ground cloth is preferably in sections so that it may be omitted from any part of the tent.

Q and Q' represent drawers or compartments under the floor of the vehicle for storage purposes, and at one end of the vehicle, underneath one of the lower berths a compartment R is preferably formed to which access may be had by means of a door $r$ leading to the exterior of the vehicle. This compartment, which is preferably lined with lead, contains storage batteries $r'$ by means of which the vehicle is lighted. $r^2$ represents light adjacent to the heads of the berths. Other lights may be placed as desired, a light $r^3$ being arranged at the rear end of the vehicle. An electrically operated horn or alarm device $r^4$ is preferably also provided at one end of the vehicle. One end of the vehicle is preferably also provided with a compartment S for a bicycle.

The vehicle described has the advantage of being always ready for immediate use. The vehicle can be readily converted from a single compartment into two compartments and the arrangement of the parts described is such as to afford the maximum amount of room within the vehicle and the maximum comfort for the limited space available. The vehicle is also constructed so that the greatest weight is in the lower portion thereof, so that the vehicle is not top heavy. The tent may be attached to the side of the vehicle if additional accommodations are desired, but can be dispensed with if the room is not needed.

I claim as my invention:

1. In a camping vehicle, the combination of a body having permanent sides and a roof, berths arranged lengthwise thereof at one side of the body, a double wall arranged between the adjacent ends of the berths, and sliding doors which are adapted to divide the interior of the body into two compartments, said sliding doors being adapted to enter into the double wall to open the interior of the body into a single compartment.

2. In a camping vehicle, the combination of a body having permanent sides and a roof, a double wall extending inwardly from one of the side walls of the body, sliding doors arranged in said double wall and adapted to divide the interior of the vehicle into two compartments, and separate entrance doors in one of said walls for each compartment.

3. In a camping vehicle, the combination of a body having permanent sides and a roof, berths arranged lengthwise at one side of the body, a wall separating said berths, and means cooperating with said wall adapted to divide the body into two compartments and to be moved into an operative position to open the interior of the body into a single compartment.

4. In a camping vehicle, the combination of a body having permanent sides and a roof, two pairs of upper and lower berths arranged end to end lengthwise at one side of said body, sliding doors between said pairs of berths and adapted to divide the interior of the vehicle into two compartments, windows arranged in said side wall, one window being arranged adjacent to each berth, and a door in the opposite side of said body, whereby the occupant of each berth can control the ventilation at his own berth as desired.

5. In a camping vehicle, the combination of a body having permanent sides and a roof, two pairs of upper and lower berths arranged end to end lengthwise at one side of said body, sliding doors between said pairs of berths and adapted to divide the interior of the vehicle into two compartments, windows arranged in said side wall, one window being arranged adjacent to each berth, said windows being slidably arranged in said side wall whereby the opening of any window can be controlled by the occupant of the adjacent berth as may be desired, and a door for each compartment in the opposite side wall of the body.

6. In a camping vehicle, the combination of a body having permanent walls and roof, means at one side of said vehicle for attaching the end walls and roof of a tent thereto, and means adjacent to the lower edges of said body to fasten a ground cloth thereto.

7. In a camping vehicle, the combination of a vehicle body, a water reservoir supported by said body near the floor thereof, an inlet connection in said reservoir near the bottom thereof into which water and air under pressure may be admitted, an air discharge pipe connecting with the top of said reservoir for discharging air from the top of said tank, a valve in said pipe for preventing discharge of air from said tank, and a water discharge faucet above said reservoir, whereby air may be admitted to said reservoir under pressure to force water from said reservoir and whereby said reservoir may be completely filled with water if desired.

8. In a camping vehicle, the combination of a vehicle body, a water reservoir connected with said body, a compartment in the side of said body opening to the exterior thereof and containing faucets in communication with said reservoir, shower bath devices in said compartment and adapted to be attached to said faucets, whereby a shower bath may be had at the exterior of said vehicle body, and means for enclosing a space at the exterior of said body adjacent said compartment.

Witness my hand this 29 day of July, 1920.

GEORGE URBAN, Jr.

Witness:
F. E. PROCHNOW.